(12) United States Patent
Yang et al.

(10) Patent No.: US 9,319,932 B2
(45) Date of Patent: *Apr. 19, 2016

(54) METHOD AND APPARATUS FOR PROVIDING CONGESTION MANAGEMENT FOR A WIRELESS COMMUNICATION NETWORK

(71) Applicant: AT&T Intellectual Property I, L.P., Atlanta, GA (US)

(72) Inventors: Chen-Yui Yang, Marlboro, NJ (US); Huang Lee, Fremont, CA (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/577,668

(22) Filed: Dec. 19, 2014

(65) Prior Publication Data

US 2015/0181463 A1 Jun. 25, 2015

Related U.S. Application Data

(63) Continuation of application No. 13/151,154, filed on Jun. 1, 2011, now Pat. No. 8,953,443.

(51) Int. Cl.

| H04W 28/02 | (2009.01) |
| H04L 12/801 | (2013.01) |
| H04L 12/813 | (2013.01) |
| H04L 12/815 | (2013.01) |
| H04L 12/851 | (2013.01) |
| H04L 12/853 | (2013.01) |

(52) U.S. Cl.
CPC ......... *H04W 28/0289* (2013.01); *H04L 47/127* (2013.01); *H04L 47/14* (2013.01); *H04L 47/20* (2013.01); *H04L 47/22* (2013.01); *H04L 47/2408* (2013.01); *H04L 47/2416* (2013.01); *H04L 47/2441* (2013.01); *H04L 47/39* (2013.01)

(58) Field of Classification Search
CPC .......................................... H04L 47/10–47/127
USPC ........................... 370/237, 252–253; 709/235
See application file for complete search history.

(56) References Cited

U.S. PATENT DOCUMENTS

| 7,054,269 B1 * | 5/2006 | Luguern ............. H04L 12/5602 370/232 |
| 7,471,689 B1 * | 12/2008 | Tripathi ................. H04L 47/10 370/395.21 |
| 8,125,910 B2 * | 2/2012 | Shimonishi ........... H04L 1/1671 370/236 |
| 8,295,170 B2 * | 10/2012 | Cuervo ............... H04L 12/1407 370/230 |
| 8,300,590 B1 * | 10/2012 | Negus .................. H04B 7/0691 370/329 |
| 8,432,815 B2 * | 4/2013 | Bruckmann .......... H04L 1/0006 370/252 |
| 8,553,540 B2 * | 10/2013 | Mehrotra ................ H04L 47/30 370/230 |
| 2005/0053046 A1 * | 3/2005 | Wang .................. H04L 12/4645 370/338 |

(Continued)

*Primary Examiner* — Andrew Chriss
*Assistant Examiner* — Rasha Fayed

(57) ABSTRACT

A method and apparatus for providing a congestion management of a wireless communication network are disclosed. For example, the method projects dynamically a trend for a network element of the wireless communication network, using a functionality metric associated with the network element of the wireless communication network, and determines if there is a potential congestion in accordance with the trend. The method then provides a notification of the potential congestion, if there is a potential congestion for the network element of the wireless communication network.

20 Claims, 6 Drawing Sheets

(56) References Cited

U.S. PATENT DOCUMENTS

| | | | |
|---|---|---|---|
| 2005/0174943 A1* | 8/2005 | Wang | H04L 12/4645 370/235 |
| 2007/0076610 A1* | 4/2007 | Yang | H04L 47/10 370/235 |
| 2008/0102841 A1 | 5/2008 | Kato | |
| 2008/0316959 A1 | 12/2008 | Bachl et al. | |
| 2009/0010259 A1* | 1/2009 | Sirotkin | H04L 47/10 370/392 |
| 2009/0092083 A1* | 4/2009 | Shagdar | H04L 41/5003 370/328 |
| 2009/0116451 A1 | 5/2009 | Ng et al. | |
| 2009/0299788 A1* | 12/2009 | Huber | G06Q 20/1235 455/456.3 |
| 2010/0027507 A1 | 2/2010 | Li et al. | |
| 2010/0075686 A1 | 3/2010 | Bhattad et al. | |
| 2010/0098012 A1 | 4/2010 | Bala et al. | |
| 2010/0189002 A1 | 7/2010 | Choi et al. | |
| 2010/0285796 A1 | 11/2010 | Iwamura et al. | |
| 2010/0330982 A1 | 12/2010 | Ishii et al. | |
| 2011/0021248 A1 | 1/2011 | Valerdi Rodriquez et al. | |
| 2011/0039546 A1 | 2/2011 | Narasimha et al. | |
| 2011/0058479 A1* | 3/2011 | Chowdhury | H04L 45/04 370/237 |
| 2011/0081932 A1 | 4/2011 | Astely et al. | |
| 2011/0105140 A1 | 5/2011 | Cheon et al. | |
| 2011/0190016 A1 | 8/2011 | Hamabe et al. | |
| 2011/0206014 A1 | 8/2011 | Lee et al. | |
| 2011/0216648 A1* | 9/2011 | Mehrotra | H04L 47/30 370/230 |
| 2011/0228863 A1 | 9/2011 | Papasakellariou et al. | |
| 2011/0231510 A1* | 9/2011 | Korsunsky | G06F 21/55 709/213 |
| 2011/0231654 A1* | 9/2011 | Somadder | H04L 12/5691 713/153 |
| 2011/1231510 | 9/2011 | Korsunsky et al. | |
| 2012/0020310 A1 | 1/2012 | Ji et al. | |
| 2012/0044812 A1 | 2/2012 | Hiddink et al. | |
| 2012/0140624 A1* | 6/2012 | Denman | H04L 41/0816 370/230.1 |
| 2012/0155298 A1* | 6/2012 | Yang | H04W 24/08 370/252 |
| 2012/0236713 A1* | 9/2012 | Kakadia | H04L 41/5025 370/230 |
| 2012/0266234 A1* | 10/2012 | Ocko | H04L 67/2861 726/17 |
| 2012/0289221 A1* | 11/2012 | Huber | G06Q 20/1235 455/422.1 |

\* cited by examiner

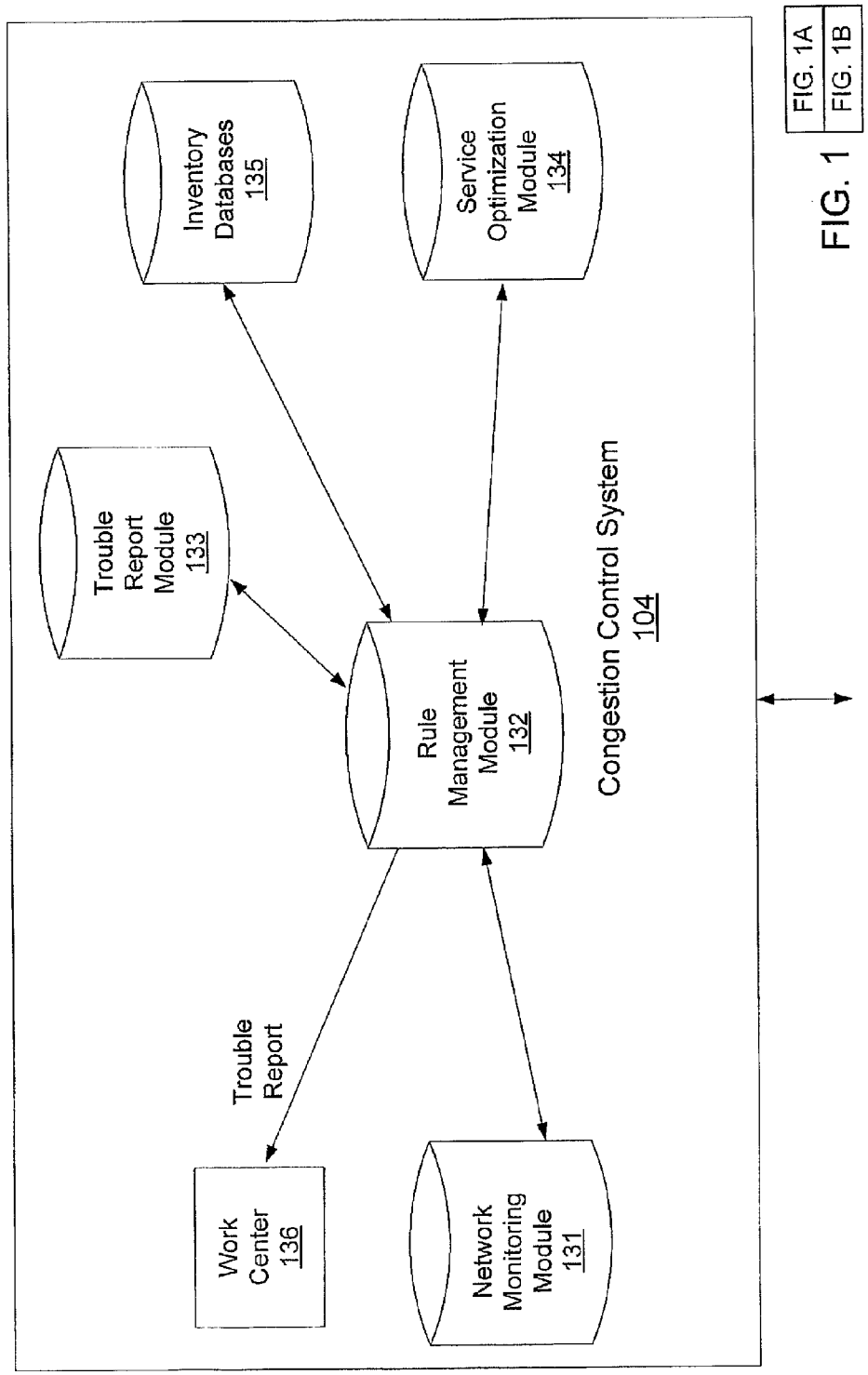

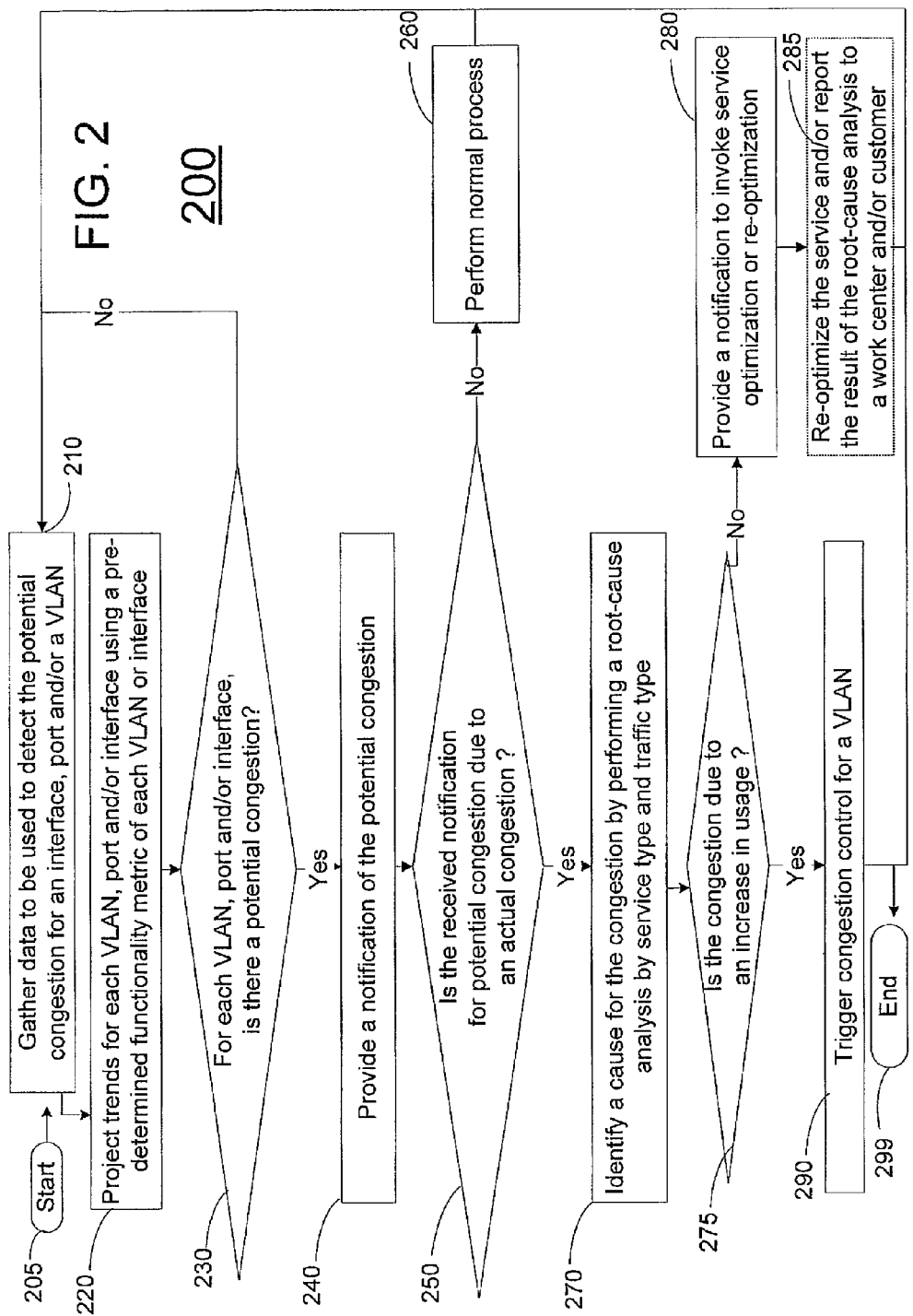

METHOD AND APPARATUS FOR PROVIDING CONGESTION MANAGEMENT FOR A WIRELESS COMMUNICATION NETWORK

This application is a continuation of U.S. patent application Ser. No. 13/151,154, filed Jun. 1, 2011, which is currently allowed and is herein incorporated by reference in its entirety.

The present disclosure relates generally to communication network and, more particularly, to a method and apparatus for providing congestion management for a wireless network, e.g., a Long Term Evolution (LTE) network.

BACKGROUND

As usage of mobile user endpoint devices continues to grow, the wireless networks are supporting an ever increasing amount of traffic to and from the mobile user endpoint devices. For example, service providers are implementing Third Generation Partnership Project (3GPP) Long Term Evolution (LTE) networks to support the ever increasing traffic. When an LTE network experiences congestion, a large number of customers will be affected. One approach to reduce the effect on customers is to design the LTE network for a worst case scenario. Unfortunately, designing for the worst case scenario reduces the efficiency of the utilization of the various network resources given that the worst case scenario may not occur on a regular basis. In addition, the design based on a worst case scenario may be cost prohibitive.

SUMMARY

In one embodiment, the present method and apparatus provide a congestion management of a wireless communication network. For example, the method projects dynamically a trend for a network element of the wireless communication network, using a functionality metric associated with the network element of the wireless communication network, and determines if there is a potential congestion in accordance with the trend. The method then provides a notification of the potential congestion, if there is a potential congestion for the network element of the wireless communication network.

BRIEF DESCRIPTION OF THE DRAWINGS

The teaching of the present disclosure can be readily understood by considering the following detailed description in conjunction with the accompanying drawings, in which:

FIG. 2 illustrates a flow chart of a method for providing congestion management for an LTE network of the present disclosure;

To facilitate understanding, identical reference numerals have been used, where possible, to designate identical elements that are common to the figures.

DETAILED DESCRIPTION

The present disclosure broadly describes a method and apparatus for providing congestion management for a wireless network, e.g., a Long Term Evolution (LTE) network. Although the teachings of the present disclosure are discussed below in the context of LTE networks, the teaching is not so limited. Namely, the teachings of the present disclosure can be applied for other types of wireless networks in accordance with other standards, e.g., 2G networks, 3G networks, etc.

In a 3GPP Long Term Evolution (LTE) network, congestion may occur for a variety of reasons. For example, the network may be congested due to introduction of applications that require large bandwidth, introduction of applications that generate bursty traffic, occurrence of network events (e.g., network failures), increase in a number of long distance high speed connections, and so on.

The network congestion may affect the quality of service. One approach to reduce network congestion is to design the network for a worst case scenario. Unfortunately, designing for the worst case scenario reduces the efficiency of the utilization of the various network resources. Furthermore, designing for a worst case scenario is very costly to a service provider of the LTE network.

To address this criticality, the present method and apparatus provide congestion detection and control capabilities that enable higher engineered loads in the network. In one embodiment, the congestion detection and control capabilities provide adaptive congestion detection and control for Virtual Local Area Networks (VLANs) in the LTE network.

Broadly defined, an eNodeB is a radio base transceiver station (RBS) as per the 3GPP standards (or simply referred to as a base station). An eNodeB provides the LTE air interface and performs radio resource management for wireless access. 3GPP is a global effort to define a wireless communication system specification. In 3GPP release 8, LTE is a set of enhancements to the Universal Mobile Telecommunications System (UMTS) which focuses on adopting 4th Generation (4G) mobile communications technology, including an all Internet Protocol (IP) end-to-end networking architecture.

Figure 1B:
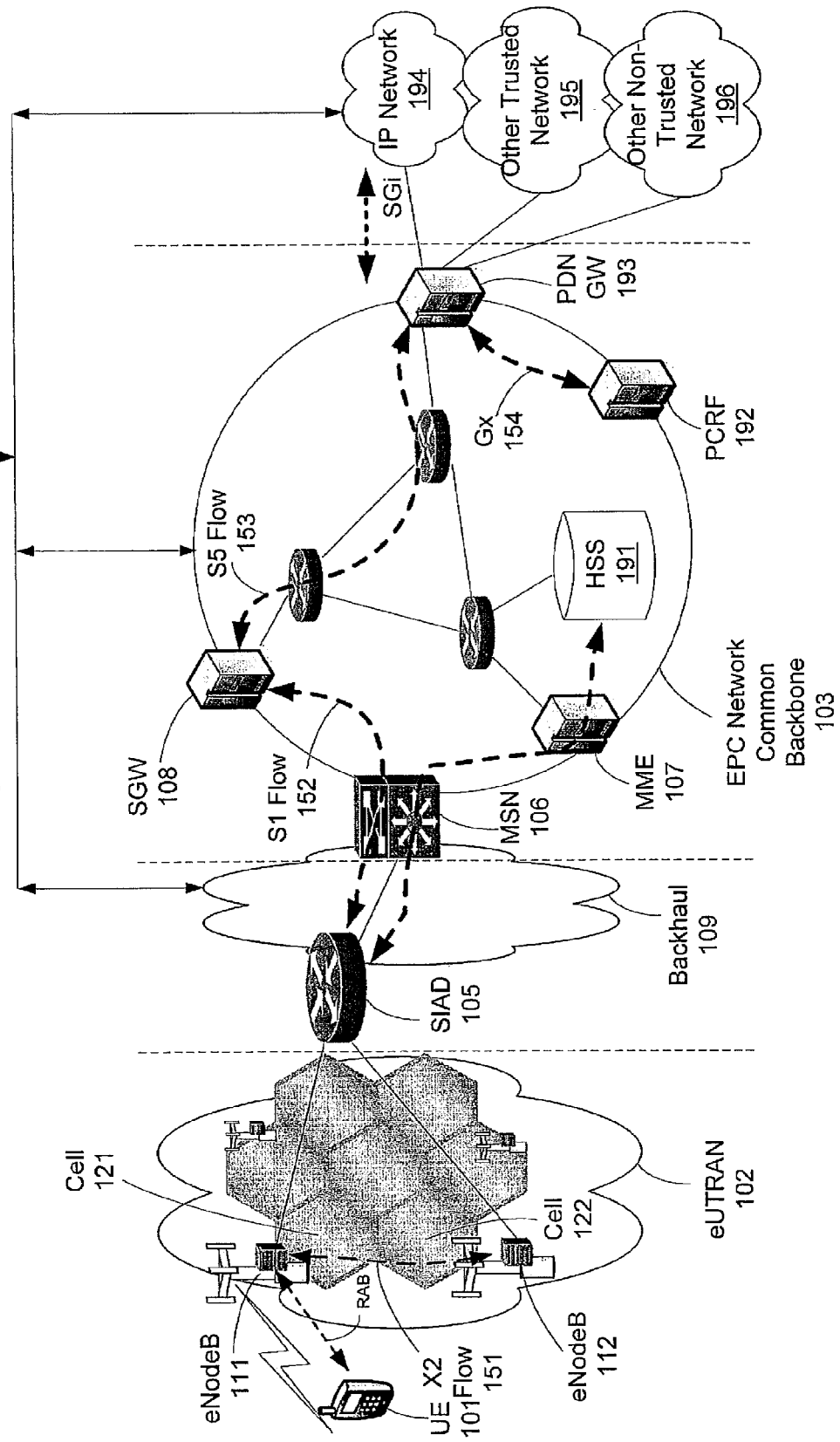
FIG. 1 (shown as FIG. 1A and FIG. 1B) illustrates an illustrative LTE network related to the present disclosure.

FIG. 1 (shown as FIG. 1A and FIG. 1B) illustrates an exemplary LTE network 100 related to the present disclosure. In one illustrative embodiment, the LTE network 100 comprises an access network 102 (e.g., an evolved Universal Terrestrial Radio Access Network (eUTRAN)), a backhaul network 109, a core network 103 (e.g., an Evolved Packet Core (EPC) network), and a congestion control system 104, e.g., supported and operated by a wireless service provider. It should be noted that congestion control system 104 can be deployed in any of the network illustrated in FIG. 1. Furthermore, although various networks are shown as separate networks in FIG. 1, it is possible that functions performed by these networks can be combined into fewer networks or expanded into a greater number of networks depending on the deployment requirements.

In one illustrative example, the eUTRAN, e.g., eUTRAN 102, may comprise one or more eNodeBs, e.g., 111 and 112. In operation, user equipment or user endpoint (UE) 101 may access wireless services via an eNodeB, e.g., eNodeB 111 or eNodeB 112 in the eUTRAN 102. UE 101 can be a smart phone, a cellular phone, a computer or laptop, or any endpoint communication devices equipped with wireless capabilities. An eNodeB, such as eNodeB 111 or 112, provides wireless interfaces to one or more UE devices. All eNodeBs in the eUTRAN 102 are connected to the EPC network 103 via one or more integrated access devices 105 (e.g., a Smart Integrated Access Device (SIAD)) located in backhaul network 109. Broadly, an integrated access device is capable of integrating both voice and data services within a single device. In one embodiment, eNodeB 111 supports wireless services covered by cell site 121, and eNodeB 112 supports wireless services covered by cell site 122. It should be noted that any number of eNodeBs can be deployed.

In one embodiment, eUTRAN 102 is connected to the EPC network 103 via the backhaul network 109. For example, SIAD 105 in the backhaul network 109 is connected to the EPC network 103 via a Multi-service Node (MSN) 106. An EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In one embodiment, the SIAD is a device that provides wireless traffic aggregation and backhaul from a cell site to an EPC network. An MSN provides layer 2 and layer 3 networking functions for wireless service between one or more SIADs and the EPC network. The eUTRAN 102 is the air interface of the 3GPP's Long Term Evolution (LTE) specifications for mobile networks. Namely, the eUTRAN comprises a radio access network standard that will replace previous generations of air interface standards.

In one embodiment, the SIAD 105 and the MSN 106 communicate over a backhaul network 109. The backhaul network may also be referred to as a metro Ethernet transport network. In one embodiment, the backhaul may comprise a plurality of paths, e.g., a primary path and a secondary path from the SIAD to the MSN. For example, two VLANs may be configured between the SIAD 105 and MSN 106. Under normal conditions, the primary VLAN is used. When a network condition occurs, e.g., a scheduled outage, a failure, etc., that affects the primary VLAN, traffic can be partially or wholly re-directed to the secondary VLAN as discussed further below. In another example, the primary and secondary VLANs may be provided over two different SIADs and two different MSNs.

In EPC network 103, network devices Mobility Management Entity (MME) 107 and Serving Gateway (SGW) 108 support various functions as part of the LTE network 100. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 103 may comprise a Home Subscriber Server (HSS) 191 that contains subscription-related information (e.g., subscriber profiles), performs authentication and authorization of a wireless service user, and provides information about the subscriber's location. The EPC network 103 may also comprise a Policy Charging and Rule Function (PCRF) 192 that supports accesses to subscriber databases and specialized functions of a charging system. The EPC network 103 may also comprise a Public Data Network Gateway (PDN GW) 193 which serves as a gateway that provides access between the EPC network 103 and various data networks, e.g., other IP networks, trusted or non-trusted networks 194-196 and the like. It should be noted that the above illustrated LTE network 100 is only illustrative and the number of network components or elements are not specifically limited as shown. Any number of network components or elements can be deployed.

In one embodiment, the congestion control system 104 comprises a collection of modules that provides congestion detection and control capabilities to address congestions that may occur in the LTE network from time to time. For example, the congestion control system 104 may comprise a network monitoring module 131, a rule management module 132, a trouble reporting module 133, a service optimization module 134, and an inventory database 135. The functions performed by these modules will be described below. It should be noted that these various modules may perform other functions. Only the functions relates to the present disclosure are herein described. Furthermore, although these modules are illustrated as separate modules, the functions performed by these modules can be implemented in one or more hardware systems, e.g., application servers and the like.

In one embodiment, the network monitoring module 131 is able to predict and identify potential congestions and to notify the rule management module 132. In turn, the rule management module is able to perform trouble isolation and root-cause analysis. If the rule management module determines that the trouble is specifically due to congestion, and the congestion is due to an increase in usage of applications that generate bursty traffic or an increase in the number of applications and/or their respective bandwidth requirements, the rule management module may send a congestion alarm to the service optimization module 134. In one embodiment, the service optimization module 134 may check to determine if monitored traffic data for a particular VLAN has risen to such an extent that it has reached or crossed one or more thresholds for congestion. When needed, i.e., the existence of congestion, the service optimization module may redirect newly arriving lower priority traffic to one or more backup VLANs.

In one embodiment, when congestion has been verified for a VLAN, e.g., a primary VLAN, the service optimization module may direct newly arriving traffic to another VLAN that serves as a backup VLAN for the congested VLAN. In one embodiment, the service optimization module redirects newly arriving lower priority traffic to a backup VLAN while continuing to serve newly arriving higher priority traffic on the primary VLAN. In one embodiment, the service optimization module enables newly arriving higher priority traffic to preempt lower priority traffic that is already being served by the primary VLAN. In one embodiment, the preempted lower priority traffic may be redirected to the backup VLAN.

In one embodiment, the inventory database 135 contains the inventory of all network topologies, VLAN configurations, interface configurations and other network data of the LTE network 100. In one embodiment, the trouble reporting module 133 communicates with the rule management module 132 and reports troubles to a work center 136.

In one embodiment, the eUTRAN network 102, the backhaul network 109 and the EPC network 103 include various data bearer paths and signaling bearer paths. The various bearer paths may be referred to by specific labels. For example, the data bearer path on line 152 may be referred to as an S1-U bearer path and the data bearer path on line 153 may be referred to as an S5 or an S8 bearer path. In another example, the signaling bearer path between the eUTRAN and the MME 107 may be referred to as an S1-MME bearer path. Note that the S1, S5, S8, Gx and X2 interfaces are standard interfaces defined by the 3GPP standard. It should be noted that the present disclosure is not limited to these specific interfaces.

Shown illustratively in FIG. 1, the X2 interface flow 151 is used to provide communication between two eNodeBs, e.g., between eNodeB 111 and eNodeB 112 within the eUTRAN network. The S1 interface flow 152 is used to provide communication between an eNodeB, such as eNodeB 111, and a device in the EPC network 103, such as MME 107 and/or SGW 108. The Gx interface flow 154 is used to provide communication between the PGW 193 (also referred to as PDN GW 193) and the PCRF 192. The S5 interface flow 153 is used to provide communication between the SGW 108 and PDN GW 193.

In one embodiment, the current method performs an adaptive congestion detection and control by first gathering performance management data for each physical and logical port in the LTE network, e.g., LTE network 100. For example, the performance management data may be gathered by a network monitoring module on a per VLAN and/or per network interface basis. For example, for the LTE network 100, the performance monitoring data may be gathered for each VLAN to eNodeB physical interface, SIAD to MSN physical interface, logical interfaces between the various network elements of the LTE network (e.g., SGW, PGW, PCRF, MME, HSS, etc.). For example, various physical interfaces can be supported by a VLAN in accordance with a VLAN assignment. Furthermore, multiple VLANs may also be supported by the same physical interface.

It should be noted that the network elements of the EPC network have external and internal VLANs. The internal VLANs may be used to support logical interfaces among the various elements of the EPC network, e.g., among PCEFs (policy and charging enforcements), SGWs and PGWs. The External VLANs may be used to support logical interfaces for communicating with other network elements of the LTE network (e.g., to eUTRAN network elements, to other packet networks, etc.).

Table 1 provides an illustrative table for VLAN identification assignments for an interface between an eNodeB to a SIAD. For example, the VLAN identification assignments may be for an interface between an eNodeB 111 or eNodeB 112 and the SIAD 105. Table 2 provides an illustrative VLAN identification assignment table for an interface between a SIAD and an MSN. For example, the interface may be between the SIAD 105 and the MSN 106. Tables 3 and 4 provide an illustrative logical interface to external VLAN assignment table and an illustrative logical interface to internal VLAN assignment table, respectively. It should be noted that these tables are only illustrative and are provided to assist in the understanding of the present disclosure.

TABLE 1

VLAN ID assignment for an interface between an eNodeB and a SIAD.

| | | Traffic Type | |
|---|---|---|---|
| Equipment Type | | Bearer VLAN | OAM VLAN | Point-to-Point VLAN |
| LTE | BBU-1 | 212 | 211 | 213 |
| eNodeB-1 | BBU-2 | 215 | 214 | 216 |
| UMTS NodeB-1 | | 101 | 102 | 103 |
| UMTS NodeB-2 | | 104 | 105 | 106 |

TABLE 2

VLAN ID assignment for an interface between a SIAD and an MSN.

| SIAD Number | Primary MSN Number | Secondary MSN Number (If applicable) |
|---|---|---|
| SIAD 1 | 1000 | 2000 |
| SIAD 2 | 1001 | 2001 |
| ... | ... | ... |
| SIAD 1000 | 1999 | 2999 |
| ... | ... | ... |
| SIAD 1200 | 3199 | 3699 |

TABLE 3

Logical interface to external VLAN assignment. External VLANs

| Interface | Supported by VLAN Number |
|---|---|
| Gn, S5, S1-U, S11 | 402 |
| SGi | 400 |
| Gx, Gy, Gz | 401 |

TABLE 4

Logical interface to internal VLAN assignment. Internal VLANs

| | SGW | PGW | PCEF |
|---|---|---|---|
| S1-U, S11, S5 | 2403 | | |
| Gn, S5 | | 2402 | |
| PGW to PCEF-c | | 1110, 1210, 1310 | 1110, 1210, 1310 |
| PGW to PCEF-u | | 2110, 2210, 2310 | 2110, 2210, 2310 |
| SGi | | | 2400 |
| Gx | | | 2600 |
| Gy, Gz | 2700 | 2700 | |
| OAM | 2001 | 2001 | 2001 |

In one embodiment, the utilization can be tracked for each physical interface or port, for each logical interface or port, and for each VLAN (each broadly referred to as a network element). For example, the network monitoring module may track various interface utilizations to detect a potential congestion for a particular interface and/or a VLAN by monitoring traffic associated the following entities or parameters:
  Diameter Credit Control Application (DCCA);
  Access Point Names (APNs);
  Charging Gateway (CG);
  GPRS Tunnel Protocol (GTP);
  Persistent Storage Device (PSD);
  PDP Contexts;
  Server Load Balancing (SLB);
  IP Traffic Thresholds; and
  Quality of Service (QoS).

In one embodiment, the data to be used by the network monitoring module is gathered using probes. For example, diagnostic probes may be placed on Ethernet links, ports, interfaces, etc.

In one embodiment, the performance data to be collected by the network monitoring module depends on the entity or parameter being monitored. For example, the type of data to be monitored at a network element level, at a card level, at a port level, at a VLAN level, at a physical interface level, at a logical interface level, and so on may be different.

In one embodiment, the performance management data to be gathered is selected by the network service provider. For example, if the network service provider considers a particular type of data as being a key indicator for congestion detection of a VLAN, the network service provider may monitor the particular type of data for various VLANs.

Table-5 provides an illustrative set of performance data to be collected by the network monitoring module.

| Level | Performance Data |
|---|---|
| Network element level | Device uptime<br>Device memory utilization (e.g., per 5 minute intervals)<br>Device CPU utilization (e.g., per 5 minute intervals)<br>Packets (e.g., Octets Received/Transmitted)<br>Device discards/errors (totals and percentages) |
| Card level | Device uptime<br>Device memory utilization (e.g., per 5 minute intervals)<br>Device CPU utilization (e.g., per 5 minute intervals)<br>Packets (e.g., Octets Received/Transmitted)<br>Device discards/errors (totals and percentages) |
| Port level | Number of unicast/multicast/broadcast packets per physical interface transmitted/received<br>Number of unicast/multicast/broadcast packets dropped per physical interface transmitted/received<br>Number of bytes/octets per physical interface Transmitted/Received<br>Number of dropped bytes errors/discards per physical interface Transmitted/Received<br>Percentage of packets dropped/discards per physical interface<br>Loss of signal count<br>Low optical power receive/transmit<br>Ethernet frames receive/transmit<br>Ethernet frame errors received/transmitted<br>Internal MAC error received/transmitted<br>Pause frame count received/transmitted |
| VLAN level | Number of unicast/multicast/broadcast packets per VLAN per interface Transmitted/Received<br>Number of unicast/multicast/broadcast packets dropped per VLAN per interface transmitted/received<br>Number of bytes/octets per VLAN per interface Transmitted/Received<br>Number of bytes/octets dropped/discards per VLAN per interface transmitted/received<br>Percentage of packet dropped/discards per VLAN per interface |
| Ga/Gz/Gy VLAN levels | Number of timeouts for each OCS/OFCS<br>Number of retries for each OCS/OFCS<br>Number of errors for each OCS/OFCS<br>Average latency on Gy for each OCS<br>Average latency on Ga/Gz for each OFCS |
| QoS level (per VLAN/Port) | Number of unicast/multicast/broadcast packets per QoS (DSCP markings) transmitted/received<br>Number of unicast/multicast/broadcast packets dropped per QoS transmitted/received<br>Number of bytes/octets per QoS transmitted/received<br>Number of bytes/octets dropped/discards per QoS Transmitted/Received<br>Percentage of packets dropped/discards per QoS |
| APN level | Number of unicast/multicast/broadcast packets per APN (transmitted/received)<br>Number of unicast/multicast/broadcast packets dropped per APN (transmitted/received)<br>Number of bytes/octets per APN (transmitted/received)<br>Number of bytes/octets dropped/discards per APN (transmitted/received)<br>Percentage of packets dropped/discards per APN<br>Number of active EPS bearers per APN<br>Number of EPS bearer activations per APN<br>Number of EPS bearer activation failures per APN<br>Number of EPS bearer deactivations per APN<br>Number of PGW initiated EPS bearer deactivations per APN<br>Number of GTP-C messages received per APN<br>Number of GTP-C messages received with errors per APN |

In one embodiment, the data may then be tracked for dynamically monitoring trends for each VLAN, port and/or interface. For example, the network monitoring module may dynamically project the trends for each VLAN, port and/or interface using a pre-determined functionality metric of each VLAN, port or interface versus utilization.

In one embodiment, the functionality metric comprises one or more of: a packet delay functionality, a packet delay over a pre-determined threshold functionality, a throughput functionality, a latency functionality, a slow response functionality, etc.

In one embodiment, utilization refers to a ratio of a measured number of packets transmitted and/or received by a network component to a maximum number of packets the network component is designed to transmit and/or receive. In one example, an interface may be designed to transmit/receive n1 packets per a given time period and the measured number of packets for the time period may by n2 packets. The utilization for the interface is then defined as n2/n1. In another example, a VLAN port may be designed to transmit/receive n1 packets per a given time period and the measured number of packets for the time period may by n2 packets. The utilization for the VLAN port is then defined as n2/n1.

In order to more clearly describe the current method, the relationships: between VLAN port utilization and the packet delay functionality; and between VLAN port utilization and the probability of packet delay over the pre-determined threshold functionality are first described.

First, let the packet delay functionality be represented by D and the port utilization be represented by x. In one embodiment, the above relationships are described with all traffic receiving the same priority treatment. In another embodiment, the relationships take into account a plurality of priority levels. The plurality of priority levels enables the service provider to offer transport prioritization based on the service provider's quality of service offerings.

In one embodiment, the LTE network may then use a Quality of service Class Identifier (QCI) in conjunction with an Allocation and Retention Priority (ARP) to create an interactive traffic class with the plurality of priority levels. The ARP contains information about the priority level of packets (e.g., a scalar with range of values 1-15), a preemption capability flag, and a preemption vulnerability flag. The ARP enables the service provider to determine whether a bearer establishment/modification request can be accepted or needs to be rejected due to a resource limitation. Table-6 provides an illustrative ARP that provides a priority level for packets of a service.

TABLE 6

An exemplary ARP

| ARP Priority Value | Packets for Service Type |
|---|---|
| 1 | Reserved for serving network |
| 2 | DPS/GETS (priority 1 subscriber general data/IMS signaling/voice traffic) |
| 3 | DPS/GETS (priority 2 subscriber general data/IMS signaling/voice traffic and priority 1 subscriber other traffic) |
| 4 | DPS/GETS (priority 3 subscriber general data/IMS signaling/voice traffic and priority 2 subscriber other traffic) |
| 5 | DPS/GETS (priority 4 subscriber general data/IMS signaling/voice traffic and priority 3 subscriber other traffic) |
| 6 | DPS/GETS (priority 5 subscriber general data/IMS signaling/voice traffic and priority 4 and 5 subscriber other traffic) |
| 7 | E911 |
| 8 | Reserved for serving network |
| 9 | Reserve for future use (e.g., premium subscriber general data/IMS signaling traffic) |
| 10 | Regular subscriber general data/IMS signaling traffic |
| 11 | Regular subscriber GBR voice traffic |
| 12 | Regular subscriber GBR other traffic |
| 13 | Reserve for future use |

TABLE 6-continued

An exemplary ARP

| ARP Priority Value | Packets for Service Type |
|---|---|
| 14 | Reserve for future use |
| 15 | Low priority user (e.g., fair share) data traffic |

It should be noted that the APN assignments provided in Table-6 illustrates certain APN assignment strategies of the service provider. As such, the APN assignment for a service may be modified by the service provider as needed and is not limited by the assignments as illustrated in Table 6.

In one embodiment, the preemption capability flag of the APR may then be used to determine which traffic may be dropped when a resource limitation is detected. For example, assume a service provider offers two priority levels: a higher priority traffic, also referred to as a type 1 traffic; and a lower priority traffic, also referred to as a type 2 traffic. It should be noted that additional priority levels are within the scope of the present disclosure.

In one embodiment, the higher priority traffic has an absolute priority over the lower priority traffic. When the higher priority traffic has an absolute priority over the lower priority traffic, if type 1 traffic arrives while a server is serving a type 2 traffic, the type 1 traffic will preempt the type 2 traffic. Namely, the server will service the type 1 traffic immediately. The server will resume serving the type 2 traffic if and when there is no more type 1 traffic to be served. The preemption rule applied when the higher priority traffic has an absolute priority over the lower priority traffic is also referred to as a preemptive-resume priority rule.

In one embodiment, the higher priority traffic has priority over the lower priority traffic only for serving newly arriving traffic, while not allowing the higher priority traffic to interrupt the lower priority traffic that is already being served. For example, new traffic bearers of type 1 are served before new traffic bearers of type 2. However, new traffic bearers of type 1 are served after existing (already being served) traffic bearers of type 2. The rule applied when the higher priority traffic is not allowed to interrupt existing lower priority bearer traffic and is also referred to as non-preemptive-resume priority rule.

Returning to the model, the delay experienced by a packet depends on the priority level associated with the packet and the type of priority rule applied when resource limitations are detected. In one example, if the packet is for a type 1 traffic and the preemptive-resume priority rule is applied, then the packet may experience a minimal delay. In another example, if the packet is for a type 2 traffic and the preemptive-resume priority rule is applied, the packet may experience an additional delay due the server interrupting the type 2 traffic in order to serve a type 1 traffic. Thus, the above relationships: between the packet delay and the VLAN port utilization, and the probability of packet delay over the pre-determined threshold and the VLAN port utilization depend on whether the preemptive-resume priority rule is applied or the non-preemptive-resume priority rule is applied.

Then, let the delay for the higher priority type of traffic be represented by D1 and the port utilization for the higher priority traffic be represented by x1. Similarly, let the delay for the lower priority type of traffic be represented by D2 and the port utilization for the lower priority traffic be represented by x2. In addition, let a1 and a2 represent parameters for a mathematical model that relates the packet delay to the port utilization for the higher priority traffic, and let a3 and a4 represent parameters for a mathematical model that relates the packet delay to the port utilization for the lower priority traffic. In one embodiment, the mathematical model assumes the maximum port utilization is known. Without loss of generality, the known maximum utilization may then be set to 1. Moreover, the model assumes that the port utilizations x1 and x2 can be measured and 1−x1−x2>0.

Then, if the preemptive-resume priority rule is applied, the model for the packet delay for the higher priority traffic is given by:

$$D1 = a1 + \frac{a2}{(1-x1)}.$$

The parameters a1 and a2 have constant values. In one embodiment, the parameter a1 has a constant value that represents the minimum value of the packet delay for the first type of traffic (the higher priority traffic). The minimum value of the packet delay, a1, comprises propagation delay, processing delay by LTE equipment, routing delay and protocol processing delay. The term $$\frac{a2}{(1-x1)}$$

describes the relationship between the packet delay due to queuing for sending the higher priority packets over a backhaul network and the port utilization, assuming an M/M/1 queuing model.

The values of the parameters a1 and a2 are determined from observed packet delay data and utilization levels that correspond to the observed packet delay data. For example, the observed packet delays for the higher priority traffic may be represented by: D1(1), D1(2), . . . , D1(N). The utilization levels that correspond to the observed packet delays may be represented by: x1(1), x1(2), . . . , x1(N).

Similarly, if the preemptive-resume priority rule is applied, the model for the packet delay for the lower priority traffic is given by:

$$D2 = a3 + \frac{a4}{(1-x1)(1-x1-x2)}.$$

The parameters a3 and a4 have constant values. The parameter a3 has a constant value that represents the minimum value of the packet delay for the second type of traffic (the lower priority traffic). The minimum value of the packet delay, a3, comprises propagation delay, processing delay by LTE equipment, routing delay and protocol processing delay. The term $$\frac{a4}{(1-x1)(1-x1-x2)}$$

describes the relationship between the packet delay due to queuing for sending the lower priority packets over a backhaul network and the port utilization, assuming an M/M/1 queuing model.

The values of the parameters a3 and a4 are determined from observed packet delay data and utilization levels that correspond to the observed packet delay data. For example, the observed packet delays for the lower priority traffic may be represented by: D2(1), D2(2), ..., D2(N). The utilization levels that correspond to the observed packet delays may be represented by: x2(1), x2(2), ..., x2(N).

In one embodiment, the values of a1, a2, a3 and a4 may be determined by minimizing the value of an objective function for best fit. It should be noted that the above functions are all convex and therefore can be optimized separately.

In one embodiment, an L1-norm is used for finding the values of a1, a2, a3 and a4 that minimize the observation noise. For example, if the preemptive-resume priority rule is applied, to solve for a1 and a2, the L1-norm objective function may be defined as:

$$\sum_{n=1,\ldots,N} \left| D1(n) - \left( a1 + a2 \frac{1}{1-x1(n)} \right) \right|.$$

Then, the values of a1 and a2 that minimize the summation are determined. Similarly, to solve for a3 and a4, the L1-norm objective function may be defined as:

$$\sum_{n=1,\ldots,N} \left| D2(n) - \left( a3 + a4 \frac{1}{(1-x1(n))*(1-x1(n)-x2(n))} \right) \right|.$$

Then, the values of a3 and a4 that minimize the summation are determined.

Similarly, if the non-preemptive-resume priority rule is applied, the model for the packet delay for the higher priority traffic is given by:

$$D1 = a1 + \frac{a2*(1+x2)}{(1-x1)}.$$

The parameters a1 and a2 have constant values. The parameter a1 has a constant value that represents the minimum value of the packet delay for the first type of traffic (the higher priority traffic). The minimum value of the packet delay, a1, comprises propagation delay, processing delay by LTE equipment, routing delay and protocol processing delay. The term $$\frac{a2*(1+x2)}{(1-x1)}$$

describes the relationship between the packet delay due to queuing for sending the higher priority packets over a backhaul network and the port utilization, assuming an M/M/1 queuing model.

The values of the parameters a1 and a2 are determined from observed packet delay data and utilization levels that correspond to the observed packet delay data. For example, the observed packet delays for the higher priority traffic may be represented by: D1(1), D1(2), ..., D1(N). The utilization levels that correspond to the observed packet delays may be represented by: x1(1), x1(2), ..., x1(N).

Similarly, if the non-preemptive-resume priority rule is applied, the model for the packet delay for the lower priority traffic is given by:

$$D2 = a3 + \frac{a4*(1-x1*(1-x1-x2))}{(1-x1)(1-x1-x2)}.$$

The parameters a3 and a4 have constant values. The parameter a3 has a constant value that represents the minimum value of the packet delay for the second type of traffic (the lower priority traffic). The minimum value of the packet delay, a3, comprises propagation delay, processing delay by LTE equipment, routing delay and protocol processing delay. The term $$\frac{a4*(1-x1*(1-x1-x2))}{(1-x1)(1-x1-x2)}$$

describes the relationship between the packet delay due to queuing for sending the lower priority packets over a backhaul network and the port utilization, assuming an M/M/1 queuing model.

The values of the parameters a3 and a4 are determined from observed packet delay data and utilization levels that correspond to the observed packet delay data. For example, the observed packet delays for the lower priority traffic may be represented by: D2(1), D2(2), ..., D2(N). The utilization levels that correspond to the observed packet delays may be represented by: x2(1), x2(2), ..., x2(N).

In one embodiment, the values of a1, a2, a3 and a4 may be determined by minimizing the value of an objective function for best fit.

In one embodiment, if the non-preemptive-resume priority rule is applied, an L1-norm is used for finding the values of a1, a2, a3 and a4 that minimize the observation noise. For example, to solve for a1 and a2, the L1-norm objective function may be defined as:

$$\sum_{n=1,\ldots,N} \left| D1(n) - \left( a1 + a2 \frac{1+x2(n)}{1-x1(n)} \right) \right|.$$

Then, the values of a1 and a2 that minimize the summation are determined.

Similarly, to solve for a3 and a4, if the non-preemptive-resume priority rule is applied, the L1-norm objective function may be defined as:

$$\sum_{n=1,\ldots,N} \left| D2(n) - \left( a3 + a4 \frac{1-x1(n)*(1-x1(n)-x2(n))}{(1-x1(n))*(1-x1(n)-x2(n))} \right) \right|.$$

Then, the values of a3 and a4 that minimize the summation are determined.

Note that an L2-norm and/or other objective functions may be used. Furthermore, a commercial optimization solver may be used. As such, the present method may be used in conjunction with one or more optimization tools and other objective functions.

Similarly, the relationship between the port utilization and the probability of packet delay over the pre-determined threshold may be mathematically modeled.

First, let the probability of packet delay over the pre-determined threshold functionality be represented by P and the port utilization be represented by x. In addition, assume a5 and a6 represent parameters for a mathematical model that relates the probability of packet delay over the pre-determined threshold to the port utilization.

Then, the model for the probability of packet delay over the pre-determined threshold is given by: P=1/(1+exp(a5*x+a6)). The parameters a5 and a6 have constant values.

The values of the parameters a5 and a6 are determined from observed data of the probability of packet delay over the pre-determined threshold data and observed port utilization levels that correspond to the observed data of the probability of packet delay over the pre-determined threshold.

For example, for the above higher priority traffic, wherein the preemptive-resume priority rule is applied, the observed probabilities of packet delay over the pre-determined threshold may be represented by: P1(1),P1(2), ..., P1(N). The utilization levels that correspond to the observed packet delays may be represented by: x1(1), x1(2), ..., x1(N).

In one embodiment, the values of a5 and a6 may be determined by maximizing the value of an objective function for best model fitting. In one embodiment, the objective function to be maximized is defined as:

$$\sum_{n=1,\ldots,N} P1(n) * \log \frac{1}{1 + \exp(a5 * x1(n) + a6)} + (1 - P1(n)) * \log \frac{\exp(a5 * x1(n) + a6)}{1 + \exp(a5 * x1(n) + a6)}.$$

Then, the values of a5 and a6 that maximize the above objective function are determined. For the higher priority traffic, using the values of the parameters a1 and a2, the method may project a trend for the packet delay functionality versus the VLAN port utilization. Using the values of the parameters a5 and a6, the method may also project a trend for the probability of packet delay over the pre-determined threshold versus the VLAN port utilization.

Similarly, a projection of a trend may be provided for each of the functionalities versus the port utilization for each VLAN and/or interface. For example, for a specific VLAN, a port utilization level of a specific level, e.g., 0.8, may be associated with: the probability of a higher priority packet being dropped reaching 0.5; the mean latency of the higher priority packets reaching 5 ms; and the probability of a higher priority packet being slowed down exceeding 10% reaching 0.15. (i.e., P1(slowdown>0.1)=0.15). Similarly, the utilization level of interfaces may be associated with specific levels of functionalities in terms of latency, packet delay, etc.

The projected trends of the above functionalities for each VLAN and/or interface may then be used to identify locations of potential congestions (bottlenecks). For example, a particular VLAN and/or interface in the network may be reaching a port utilization threshold that is associated with a cut-off point for one or more of the above functionalities. For example, if a latency of n milliseconds is unacceptable, and the port utilization level of 0.9 for an interface is associated with a mean latency of n milliseconds, the method identifies potential congestion for the interface as the port utilization of the interface approaches 0.9. Note that the interface may be performing at acceptable levels in terms of other functionalities, e.g., throughput. Thus, the potential congestion may be detected for the interface based on reaching a port utilization level that affects one or more of the key functionalities.

The network monitoring module may then project the trends of the functionalities and identify potential congestions (bottlenecks). If the potential congestion is detected, the network monitoring module notifies a rule management module of the congestion.

It is important to note that the rule management module may be notified of other network trouble events, e.g., events other than potential congestion events. Therefore, in one embodiment, the rule management module needs to first verify whether a reported potential congestion is due to congestion or another event that manifests itself in a similar manner. For example, congestions, VLAN configuration errors, other network events, etc. may all have similar manifestation from the perspective of the network monitoring module. The received potential congestion notification needs to be analyzed to verify whether a real congestion actually exists. The rule management module may then initiate trouble isolation to determine if the received report of a potential congestion from the network monitoring module is due to a network event, an incorrect VLAN configuration, a mismatch between a quality of service and a class of service, or an actual congestion (bottleneck).

In one embodiment, if the rule management module determines that the reported potential congestion is actually not due to congestion, the method proceeds to a particular process that handles the particular network event. For example, the reported potential congestion may in actuality be due to a network failure event, an incorrect VLAN configuration or a mismatch between a quality of service and a class of service. The method may then proceed to the respective pertinent process that handles the particular network failure event, re-configuration of the VLAN, configurations of the quality of service and the class of service, etc. If the rule management module verifies that the reported potential congestion is due to a congestion (i.e., not due to another network trouble that manifests itself similarly), the method proceeds to a root-cause analysis.

An interface or VLAN congestion may be caused due to a number of reasons. A root-cause analysis may then be performed to identify the reason for the congestion. For example, the congestion may be caused by one or more of:

A higher utilization level of buffers in network routers due to an increase in a number of long distance high-speed connections;

An increase in usage of applications that generate bursty traffic;

A mismatch of link speeds in a network topology;

A lack of appropriate congestion control mechanism in network protocols, e.g., lack of border gateway protocol (BGP); and An increase in the number of applications and/or their respective bandwidth requirements over the internet.

In one embodiment, if the congestion is due to a higher utilization level of buffers in network routers due to: an increase in a number of long distance high-speed connections; a mismatch of link speeds in a network topology; or a lack of appropriate congestion control mechanism in network protocols, the method will notify a service optimization module. For example, the rule management module reports the result of the root-cause analysis to the service optimization module. The service optimization module may use the results of the root-cause analysis to take a corrective action that improves the utilization. For example, the service optimization module may correct the detected mismatch or to implement the appropriate congestion control mechanism such that the utilization level improves. In one embodiment, the service optimization module may also report the results of the root-cause analysis to a work center and/or customer.

In one embodiment, if the congestion is due to an increase in usage of applications that generate bursty traffic or an increase in the number of applications and/or their respective bandwidth requirements over the internet, the method proceeds to trigger congestion control for the affected VLAN. For example, the rule management module may send an alarm to the service optimization module when the result of the root-cause analysis indicates that a particular VLAN is congested due to an increase in usage. The service optimization module may check if additional performance monitoring data for a particular VLAN has crossed a threshold for congestion. For example, if a particular VLAN is overloaded, the VLAN may have a slow response, or packets may be dropped at a higher rate than normal, etc. In one embodiment, the service optimization module may then trigger a VLAN congestion control for the particular VLAN. In one embodiment, the triggering of the congestion control may re-direct traffic from the congested VLAN (e.g., a congested primary VLAN) to a secondary VLAN or other VLAN.

For example, a primary VLAN and a secondary VLAN may be configured between a SIAD and an MSN. A VLAN may be overloaded, optimally loaded or under loaded. If the primary VLAN is overloaded based on the projected trending as described above, the service optimization module may redirect newly arriving lower priority traffic to the backup VLAN.

If the primary VLAN is optimally loaded, the method maintains the congestion control level. For example, the service optimization module takes no action to redirect traffic to another VLAN. If the primary VLAN is under loaded, the service optimization module will direct newly arriving traffic to the primary VLAN. For example, the primary VLAN may be able to handle more traffic than currently being offered.

If both the primary VLAN and the secondary VLAN are overloaded, the service optimization module needs to take one or more other actions to increase VLAN port utilization levels. For example, the method may implement a quality of service policy change.

In one embodiment, the redirection of traffic may be performed dynamically. In one embodiment, the redirection of traffic is performed by re-configuring VLAN identification (VLAN ID) assignments.

In one embodiment, the triggering of congestion control may be based on mean values for each of the functionalities. For example, mean latency, mean number of packets dropped, etc. In another embodiment, the triggering of congestion control may be based on maximum values for each of the functionalities, e.g., maximum latency, maximum number of packets dropped, etc. The service provider may selectively determine the desired statistical behavior.

In one embodiment, the port utilization threshold for triggering of congestion control may be set for each interface. In one embodiment, the port utilization threshold for triggering of congestion control may be set for a group of interfaces. In one embodiment, the port utilization threshold for triggering of congestion control for a specific interface may be determined based on a service level agreement between the network service provider and the subscriber (e.g., a customer).

FIG. 2 illustrates a flow chart of a method 200 for providing congestion management for a wireless network, e.g., an LTE network of the present disclosure. For example, one or more steps of method 200 can be implemented by the congestion control system 104. Method 200 starts in step 205 and proceeds to step 210.

In step 210, method 200 dynamically gathers data to be used to detect the potential congestion for an interface, a port and/or a VLAN. For example, a network monitoring module of a congestion control system may gather performance monitoring data from one or more eUTRAN and EPC network elements in near real time or on a delayed manner, e.g., every 15 minutes, every hour, every two hours and so on.

In step 220, the method may project trends for each interface, port and/or VLAN using a pre-determined functionality metric of each interface, port and/or VLAN. Each of the functionality metric versus utilization is tracked. For example, a network monitoring module may track packet delay versus interface utilization, packet delay versus port utilization, throughput versus interface utilization, and so on. For each functionality, a projection of a trend of the functionality versus the utilization may then be provided.

In one embodiment, the functionality metric comprises one or more of: a packet delay functionality metric, a packet delay over a pre-determined threshold functionality metric, a throughput functionality metric, a latency functionality metric, a slow response functionality metric, and the like.

In step 230, method 200 determines, for each interface, port and/or VLAN, if there is a potential congestion in accordance with the projected trends of the above functionality metrics. For example, the network monitoring module may identify a potential congestion for a particular interface, port or VLAN by determining if the respective utilization level of the interface, port or VLAN has reached or exceeded a utilization threshold that is associated with an un-acceptable level of performance for at least one of the above functionality metrics. For example, a particular interface, port or VLAN in the network may be reaching a utilization threshold that is associated with a cut-off point for the packet delay functionality metric. If a potential congestion is detected for an interface, a port and/or a VLAN, the network monitoring module proceeds to step 240. Otherwise, the method proceeds to step 210 to continue gathering data.

In step 240, method 200 provides a notification of the potential congestion. For example, the network monitoring module notifies the rule management module that a particular interface, port and/or VLAN is potentially reaching a utilization level that is associated with an un-acceptable level of performance in terms of one or more of the above functionality metrics.

In step 250, method 200 determines whether the potential congestion is due to an actual congestion, e.g., by performing trouble isolation to verify if the received notification of a potential congestion is due to an actual congestion condition. For example, the rule management module may initiate a trouble isolation method to determine if the received notification (or report) from the network monitoring module is due to a network event (e.g., a network failure event), an incorrect VLAN configuration, a mismatch between a quality of service and a class of service, or a congestion (i.e., bottleneck). If the method verifies that the received notification is due to an actual congestion condition, the method proceeds to step 270. If the method verifies that the received notification is in reality due to another network trouble (i.e., a non-congestion related problem) that manifests itself in a similar manner as a congestion condition, the method proceeds to step 260. For example, if the rule management module determines that the reported trouble is due to a network event, an incorrect VLAN configuration or a mismatch between a quality of service and a class of service, the method proceeds to step 260.

In step 260, method 200 performs the "normal" or pertinent process that handles the particular network event, e.g., re-configuring the VLAN, setting the configuration of the quality of service and the class of service, etc. The method proceeds to step 210 to continue gathering data.

In step 270, method 200 identifies a cause for the congestion by performing a root-cause analysis by a service type and a traffic type. For example, the interface, port and/or VLAN congestion may be caused due to a number of reasons. The root-cause analysis may then be performed to identify a particular reason for the congestion based on the type of service and the type of traffic.

For example, the congestion may be caused by: a higher utilization level of buffers in network routers due to an increase in a number of long distance high-speed connections; an increase in usage of applications that generate bursty traffic; a mismatch of link speeds in a network topology; a lack of appropriate congestion control mechanism in network protocols, e.g., lack of border gateway protocol (BGP); and an increase in the number of applications and/or their respective bandwidth requirements over the internet.

In step 275, method 200 determines if the congestion is due to an increase in usage. For example, the congestion may be due to an increase in usage of applications that generate bursty traffic, an increase in the number of applications, or an increase in bandwidth requirements of applications. If the congestion is due to an increase in usage, the method proceeds to step 290. Otherwise, the method proceeds to step 280.

In step 280, method 200 provides a notification to invoke service optimization or re-optimization. For example, the congestion may be due to a higher utilization level of buffers in network routers due to: an increase in a number of long distance high-speed connections; a mismatch of link speeds in a network topology; or a lack of appropriate congestion control mechanism in network protocols. The rule management module may then notify a service optimization module of the result of the root-cause analysis. The method then proceeds to step 285.

In optional step 285, method 200 may then re-optimize the service and/or report the result of the root-cause analysis to a work center and/or customer. For example, the service optimization module may modify a quality of service, modify network topology, etc., correct a mismatch, and/or report the result of the root-cause analysis to the work center and/or customer. The method then proceeds to either step 299 to end processing of the current data or return to step 210 to continue gathering data.

In step 290, method 200 triggers a congestion control. For example, a primary VLAN and a secondary VLAN may be configured between a SIAD and an MSN. If the primary VLAN is congested and the secondary VLAN is not congested based on the projected trending described above, the method may trigger a congestion control for the primary VLAN. In another example, a non-preemptive-resume priority rule may be applied by a service optimization module. For example, the congestion control may then be performed by the service optimization module by redirecting newly arriving lower priority traffic to the secondary (backup) VLAN, while allowing newly arriving higher priority traffic to be served by the primary VLAN. In yet another example, a preemptive-resume priority rule may be applied by allowing newly arriving higher priority traffic to preempt lower priority traffic that was already being served. A detailed discussion is provided below to further disclose various congestion control methods. The method then proceeds to either step 299 to end processing the current data or return to step 210 to continue gathering data.

In one embodiment, when the congestion control for the VLAN is triggered in step 290, traffic is directed to the VLAN in accordance with the utilization levels of the VLAN itself and the condition of the backup VLAN. One method for directing traffic to the VLAN is illustrated below in FIG. 3.

It should be noted that if the primary VLAN is optimally loaded, no action is taken to redirect traffic to the secondary VLAN and newly arriving traffic continues to be directed to the primary VLAN. Furthermore, the redirection of traffic from the primary VLAN to the secondary VLAN reduces the congestion if both VLANs are not simultaneously overloaded. In the event that both the primary VLAN and the secondary VLAN are overloaded, the service optimization module may need to take one or more other actions to improve VLAN utilization levels. For example, traffic can be redirected to yet another VALN and so on. In another example, the method may need to implement a quality of service policy change. The policy change may affect the Quality of service Class Identifier (QCI) and the Allocation and Retention Priority (ARP).

In one embodiment, the redirection of traffic is performed dynamically. In one embodiment, the redirection of traffic is performed by re-configuring VLAN identification (VLAN ID) assignments. For example, traffic from a selected list of SIADs, from a selected list of physical interfaces on SIADs, from a selected list of logical interfaces supported by the congested primary VLAN, or combinations thereof, may be directed to the secondary VLAN.

In one embodiment, the redirection of traffic continues until a utilization threshold for returning traffic to the primary VLAN is reached. For example, the service provider may set a second utilization threshold, wherein the second utilization threshold is associated with normal conditions for all tracked functionality metrics. For example, the second utilization threshold may be a utilization level that indicates that all functionality metric, e.g., the packet delay functionality metric, the packet delay over the pre-determined threshold functionality metric, the throughput functionality metric, etc. are normal.

In one embodiment, the service optimization module performs the congestion control using an algorithm that tracks overloads of VLANs (primary and secondary), directs traffic to one of the VLANs in accordance with the overload conditions on the VLANs, and takes other actions if the VLAN congestion control algorithm cannot be invoked due to congestion on both the primary and backup VLANs. It should be noted that additional VLANs greater than two (primary and secondary) can be employed.

Figure 3:
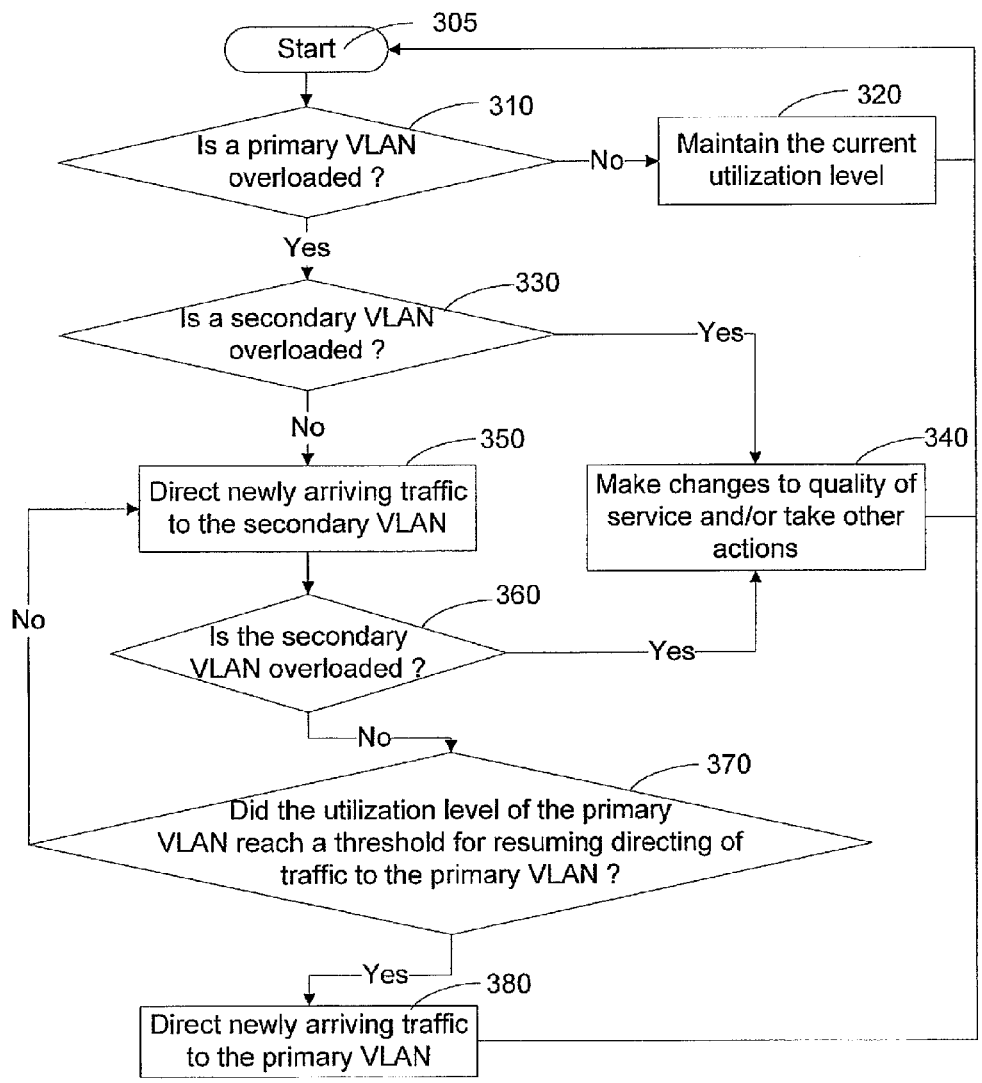
FIG. 3 illustrates a flow chart of a method for providing a congestion control by directing traffic to a secondary virtual local area network (VLAN)

FIG. 3 illustrates a flow chart of a method 300 for directing traffic to a primary VLAN of the present disclosure using a utilization level. As described above, method 200 may trigger a congestion control, if necessary. In one embodiment, the traffic is directed to the primary VLAN or the backup of the primary VLAN (the secondary VLAN) based on congestion conditions and utilization levels of the primary and secondary VLANs. The triggering of the congestion control then operates in conjunction with a method that directs traffic. For example, one or more steps of the method 300 for directing traffic can be implemented by a service optimization module. Method 300 starts in step 305 and proceeds to step 310.

In step 310, method 300 determines if a primary VLAN is overloaded. For example, a particular primary VLAN may be operating with a utilization level above a pre-determined threshold. For example, a utilization level of 0.8, 0.9, etc. may be set as the pre-determined threshold. It should be noted that the present disclosure is not limited by a particular threshold value. If the primary VLAN is overloaded, the method proceeds to step 330. Otherwise, the method proceeds to step 320.

In step 320, method 300 maintains the current utilization level. For example, the method makes no changes to the current VLAN ID assignments such that the physical and logical interfaces supported by the primary VLAN continue to direct traffic to the primary VLAN. The method then proceeds to step 310.

In step 330, method 300 determines if a backup (secondary) VLAN is overloaded. For example, the secondary VLAN may be serving as a backup VLAN to the overloaded primary VLAN. If the secondary VLAN is overloaded, the method proceeds to step 340. Otherwise, the method proceeds to step 350.

In step 340, method 300 makes changes to the quality of service associated with the provided services (e.g., dropping packets, queuing packets) and/or takes other actions (adding more hardware or physical resources to support the VLANs), wherein the other actions are intended to improve the utilization levels of the primary VLAN and the secondary VLAN. The method then proceeds to step 310.

In step 350, method 300 directs newly arriving traffic to the secondary VLAN. For example, newly arriving low priority traffic may be directed to the secondary VLAN by re-configuring the pertinent VLAN ID assignments.

In step 360, method 300 determines if the secondary VLAN is overloaded. For example, the secondary VLAN may become overloaded over time. If the secondary VLAN is overloaded, the method proceeds to step 340. Otherwise the method proceeds to step 370.

In step 370, method 300 determines if the utilization level of the primary VLAN has reached a threshold for resuming directing of traffic back to the primary VLAN. For example, if the utilization level drops from a level that indicated congestion (e.g., a utilization level of 0.8) to a level that indicates that the primary VLAN is under-loaded (e.g., a utilization level of 0.5), the method determines that traffic may now be directed to the primary VLAN. For example, the VLAN ID assignments may be re-configured such that the primary VLAN is being used instead of the secondary (backup) VLAN. If the method determines that the utilization level has reached the threshold for resuming directing of traffic to the primary VLAN, the method proceeds to step 380. Otherwise, the method proceeds to step 350.

In step 380, method 300 directs newly arriving traffic to the primary VLAN. For example, the method directs newly arriving traffic to the primary VLAN instead of the backup VLAN. The method then proceeds to step 310 or ends, e.g., when called by method 400 as discussed below.

Figure 4:
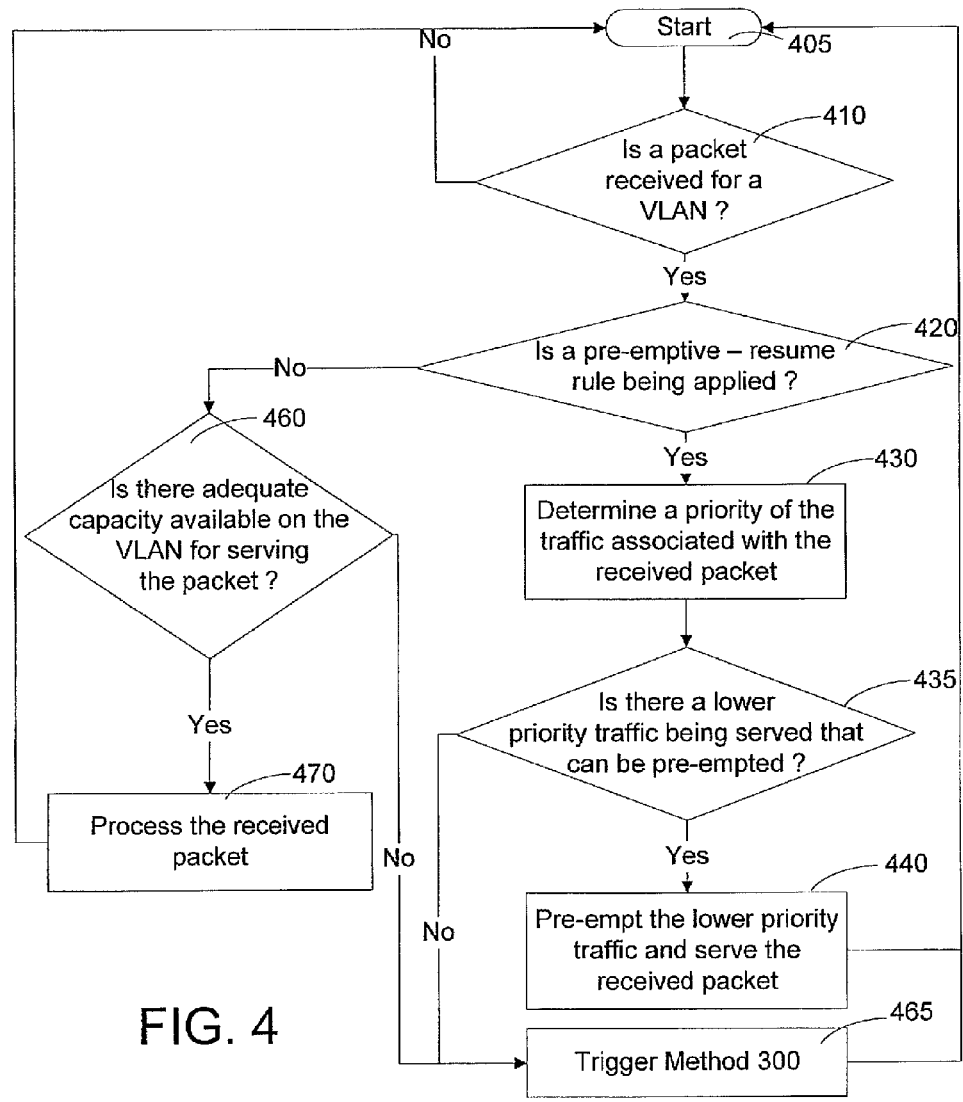
FIG. 4 illustrates a flow chart of a method for providing a congestion control for controlling traffic.

FIG. 4 illustrates a flow chart of a method 400 for providing a congestion control (broadly a priority handling congestion control) for controlling traffic for a VLAN. As described above, method 200 may trigger a congestion control, if necessary. In one embodiment, when congestion exists, traffic can be managed based on whether preemption of a lower priority traffic to serve a higher priority traffic is allowed. The triggering of the congestion control then operates in conjunction with a method that directs traffic in accordance with a preemptive-resume rule or a non-preemptive-resume rule that is being applied. For example, one or more steps of the method 400 for directing traffic can be implemented by a service optimization module. Method 400 starts in step 405 and proceeds to step 410.

In step 410, method 400 determines if a packet is received for a VLAN. For example, the method determines if a packet to be processed via a congestion control method is received. If a packet is received for the VLAN, the method proceeds to step 420. Otherwise, the method returns to step 410.

In step 420, method 400 determines if a preemptive-resume rule is being applied. If the preemptive-resume rule is being applied, the method proceeds to step 430. Otherwise the method proceeds to step 460.

In step 430, method 400 determines a priority of the traffic (or broadly data flow) associated with the received packet. For example, the packet may be for a higher priority traffic type (e.g., traffic type 1 described above) or a lower priority traffic type (e.g., traffic type 2 described above or lower if there are more types).

In one embodiment, the received traffic may have any number of priority levels. For example, Table-6 indicated 15 priority levels for traffic. It should be noted that the network service provider may determine any appropriate number of priority levels to be supported. Moreover, the various priority levels may be mapped to any number of classes of service. For example, traffic from priority levels one (1) to two (2) may be mapped to a first class of service, priority levels three (3) to six (6) may be mapped to another class of service, and so on. The pre-emption of the current method may be performed based on any number of mapping schemes. As such, the determination of whether a packet has a higher priority traffic type as compared to that of another packet that has a lower priority traffic type may be based on a priority scheme as shown in Table-6, a mapping of the priorities to classes of service, or any other type of priority mapping.

In step 435, method 400 determines if there is a lower priority traffic being served that may be preempted. If there is a lower priority traffic being served, the method proceeds to step 440. Otherwise, the method proceeds to step 465.

In step 440, method 400 preempts the lower priority traffic and serves the current packet immediately. The method may then return to serve the lower priority traffic and/or proceed to step 410 to continue receiving packets. In another embodiment, the preempting of the lower priority traffic is performed simply by re-allocating bandwidth that was previously allocated to the lower priority traffic type, e.g., allocating more bandwidth to a higher priority level and allocating less bandwidth to a lower priority level.

For example, the higher priority traffic may have been allocated 50% of the bandwidth of the VLAN and the lower priority traffic may have been allocated the remaining 50% of the bandwidth of the VLAN. If reallocation is required, then the preemption may then be performed by increasing the bandwidth allocation for the higher priority traffic, and consequently reducing the allocation for the lower priority traffic. For instance, the new bandwidth allocation for the VLAN may allocate 60% for the higher priority traffic type and 40% for the lower priority traffic type, and so on.

In another example, there may be more than two levels of priority of traffic. The preemption may then be performed by re-allocating the VLAN's bandwidth for all the priority levels, or by re-allocating for some levels of priorities—while leaving allocations for other levels of priorities unchanged. The pre-emption may then be performed by first selecting the priority level that is to be targeted for a reduction of its bandwidth allocation. For example, if there are four priority levels, the highest priority type may preempt traffic of the second highest priority level, traffic of the third highest priority level, and/or traffic of the lowest priority level. For instance, the re-allocation may be performed by allocating bandwidth that was previously allocated to the lowest priority level traffic, the second highest priority level, and/or the third highest priority level.

In step 460, method 400 determines if there is adequate capacity available on the VLAN for serving the packet, i.e., without preemption. If there is adequate capacity available on the VLAN for serving the packet, the method proceeds to step 470. Otherwise, the method proceeds to step 465.

In step 470, method 400 processes or serves the packet that is received immediately. For example, the method serves the new traffic because there is adequate capacity on the VLAN. The method then proceeds to step 410.

In step 465, method 400 may trigger method 300 as discussed above. The method then proceeds to step 410.

Thus, the method 300 and method 400 are congestion management methods that can be triggered by the method 200 for providing congestion management for a wireless network, e.g., an LTE network. It should be noted that methods 300 and 400 can be implemented individually or in conjunction with each other. For example, the method 300 and the method 400 may be used simultaneously to consider conditions of both the primary and secondary VLANs, and the rules that govern whether the pre-emptive-resume rule or the non-preemptive-resume rule is to be applied during the directing of traffic to the pertinent VLAN.

It should be noted that although not explicitly specified, one or more steps of the method 200, 300 or 400 described herein may include a storing, displaying and/or outputting step as required for a particular application. In other words, any data, records, fields, and/or intermediate results discussed in the method can be stored, displayed, and/or outputted to another device as required for a particular application. Furthermore, steps or blocks in FIG. 2, FIG. 3 or FIG. 4 that recite a determining operation, or involve a decision, do not necessarily require that both branches of the determining operation be practiced. In other words, one of the branches of the determining operation can be deemed as an optional step.

Figure 5:
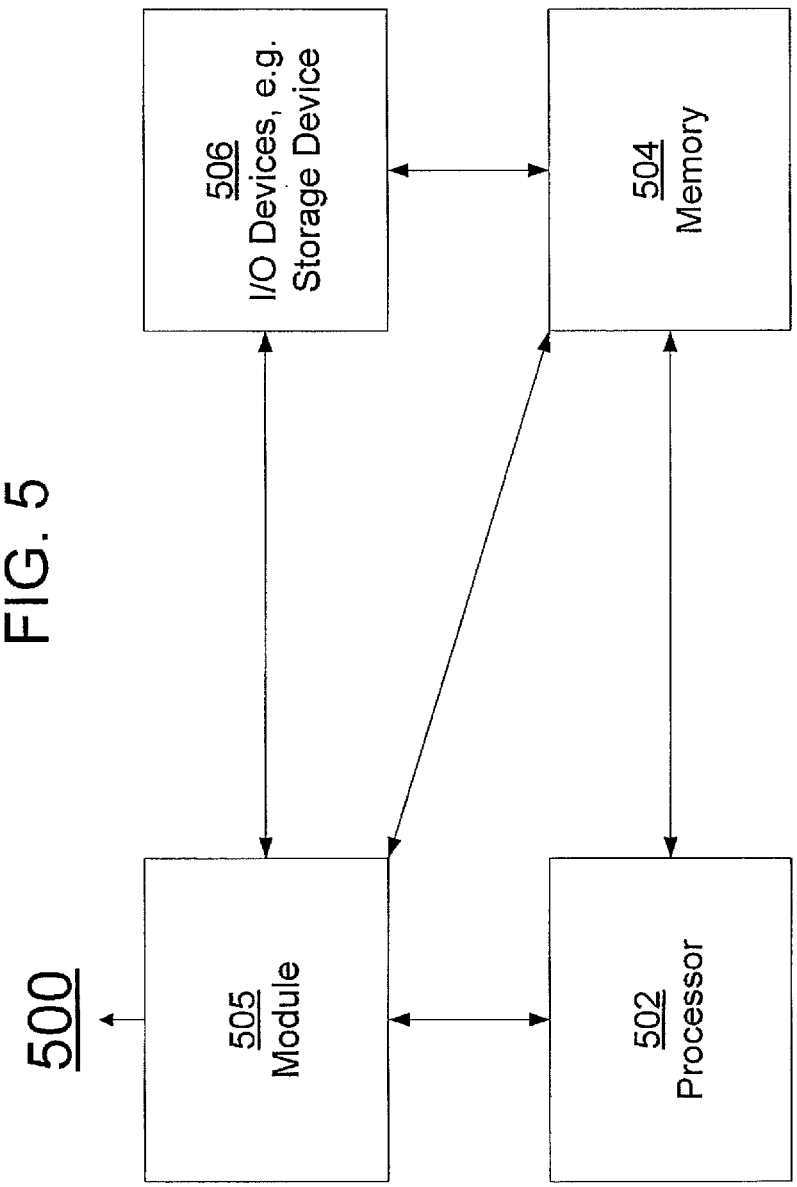
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a VLAN congestion control, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 for providing a VLAN congestion control can be loaded into memory 504 and executed by processor 502 to implement the functions as discussed above. As such, the present process 505 for providing a VLAN congestion control (including associated data structures) of the present disclosure can be stored on a non-transitory (e.g., tangible and physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing congestion management for a wireless communication network, comprising:
   projecting, via a processor, dynamically a trend for a network element of the wireless communication network, using a functionality metric associated with the network element of the wireless communication network, wherein the projecting the trend comprises projecting the trend using the functionality metric of the network element as a function of a utilization level of the network element, wherein the functionality metric comprises a throughput functionality metric, wherein the utilization level comprises a ratio between a measured number of packets transmitted and a maximum number of packets the network component is designed to transmit;
   determining, via the processor, if there is a potential congestion in accordance with the trend, wherein the potential congestion is detected when the trend of the functionality metric associated with the network element is approaching a cut-off point, wherein the network element is still performing at an acceptable level when the potential congestion is detected; and
   providing, via the processor, a notification of the potential congestion, when there is a potential congestion for the network element of the wireless communication network.

2. The method of claim 1, wherein the network element comprises an interface.

3. The method of claim 1, wherein the network element comprises a port.

4. The method of claim 1, wherein the network element comprises a virtual local area network.

5. The method of claim 1, further comprising:
   performing a trouble isolation to determine if the notification is due to an actual congestion condition.

6. The method of claim 5, further comprising:
   identifying a cause for the actual congestion condition by performing a root-cause analysis by a service type and a traffic type, when the trouble isolation determined that the notification is due to the actual congestion condition.

7. The method of claim 6, wherein the root-cause analysis determines if the actual congestion condition is due to an increase in usage.

8. The method of claim 7, further comprising:
   triggering a congestion control for the network element when the actual congestion condition is due to the increase in usage.

9. The method of claim 8, wherein the triggering the congestion control comprises:
   determining if a first virtual local area network is operating with a utilization level above a first pre-determined threshold;
   determining if a second virtual local area network is operating above a second pre-determined threshold, when the first virtual local area network is operating with the utilization level above the first pre-determined threshold; and
   directing newly arriving traffic to the second virtual local area network, when the second virtual local area network is not operating with a utilization level above the second pre-determined threshold.

10. The method of claim 9, further comprising:
    determining if the utilization level of the first virtual local area network reached a third pre-determined threshold, wherein the third pre-determined threshold is a threshold for resuming directing of traffic back to the first virtual local area network; and
    directing newly arriving traffic to the first virtual local area network, when the utilization level of the first virtual local area network has reached the third pre-determined threshold.

11. The method of claim 1, wherein the determining the potential congestion is based on data gathered by a network service provider.

12. The method of claim 1, wherein the functionality metric further comprises a packet delay functionality metric.

13. The method of claim 1, wherein the pre-determined functionality metric further comprises a latency functionality metric.

14. The method of claim 1, wherein the pre-determined functionality metric further comprises a slow response functionality metric.

15. The method of claim 8, wherein the triggering the congestion control comprises employing a priority handling congestion control.

16. A non-transitory computer-readable medium storing a plurality of instructions which, when executed by a processor, cause the processor to perform operations for providing congestion management for a wireless communication network, the operations comprising:

projecting dynamically a trend for a network element of the wireless communication network, using a functionality metric associated with the network element of the wireless communication network, wherein the projecting the trend comprises projecting the trend using the functionality metric of the network element as a function of a utilization level of the network element, wherein the functionality metric comprises a throughput functionality metric, wherein the utilization level comprises a ratio between a measured number of packets transmitted and a maximum number of packets the network component is designed to transmit;

determining if there is a potential congestion in accordance with the trend, wherein the potential congestion is detected when the trend of the functionality metric associated with the network element is approaching a cut-off point, wherein the network element is still performing at an acceptable level when the potential congestion is detected; and providing a notification of the potential congestion, when there is a potential congestion for the network element of the wireless communication network.

17. An apparatus for providing congestion management for a wireless communication network, comprising:

a processor; and a computer readable medium storing a plurality of instructions which, when executed by the processor, cause the processor to perform operations, the operations comprising:

projecting dynamically a trend for a network element of the wireless communication network, using a functionality metric associated with the network element of the wireless communication network, wherein the projecting the trend comprises projecting the trend using the functionality metric of the network element as a function of a utilization level of the network element, wherein the functionality metric comprises a throughput functionality metric, wherein the utilization level comprises a ratio between a measured number of packets transmitted and a maximum number of packets the network component is designed to transmit;

determining if there is a potential congestion in accordance with the trend, wherein the potential congestion is detected when the trend of the functionality metric associated with the network element is approaching a cut-off point, wherein the network element is still performing at an acceptable level when the potential congestion is detected; and providing a notification of the potential congestion, when there is a potential congestion for the network element of the wireless communication network.

18. The apparatus of claim 17, further comprising:

performing a trouble isolation to determine if the notification is due to an actual congestion condition.

19. The apparatus of claim 18, further comprising:

identifying a cause for the actual congestion condition by performing a root-cause analysis by a service type and a traffic type, when the trouble isolation determined that the notification is due to the actual congestion condition.

20. The apparatus of claim 19, wherein the root-cause analysis determines if the actual congestion condition is due to an increase in usage.

\* \* \* \* \*